(12) United States Patent
Sasaki et al.

(10) Patent No.: US 7,439,489 B2
(45) Date of Patent: Oct. 21, 2008

(54) PHOTOELECTRIC ENCODER AND ELECTRONIC EQUIPMENT USING THE SAME

(75) Inventors: Masato Sasaki, Nara-ken (JP); Norikazu Okada, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/847,176

(22) Filed: Aug. 29, 2007

(65) Prior Publication Data

US 2008/0054167 A1 Mar. 6, 2008

(30) Foreign Application Priority Data

Aug. 30, 2006 (JP) ............... 2006-233773
Dec. 22, 2006 (JP) ............... 2006-345859

(51) Int. Cl.
*G01D 5/34* (2006.01)
(52) U.S. Cl. .................... 250/231.13; 341/13
(58) Field of Classification Search ............ 250/231.13, 250/231.14, 231.16–231.18, 214 R; 356/616–617; 341/9, 13
See application file for complete search history.

(56) References Cited

U.S. PATENT DOCUMENTS

| | | | |
|---|---|---|---|
| 4,691,101 A * | 9/1987 | Leonard | 250/231.16 |
| 7,227,125 B2 * | 6/2007 | Sannomiya et al. | 250/231.13 |
| 2001/0030282 A1 * | 10/2001 | Steegmueller et al. | 250/231.13 |
| 2006/0226349 A1 | 10/2006 | Okada et al. | |
| 2007/0001108 A1 | 1/2007 | Sannomiya et al. | |
| 2007/0008190 A1 | 1/2007 | Sannomiya et al. | |

FOREIGN PATENT DOCUMENTS

| | | |
|---|---|---|
| JP | 59-40258 | 3/1984 |
| JP | 61-292016 | 12/1986 |
| JP | 63-179212 A | 7/1988 |
| JP | 6-317432 A | 11/1994 |
| JP | 2604986 Y2 | 4/2000 |
| JP | 2001-264109 A | 9/2001 |
| JP | 2005-257381 A | 9/2005 |
| JP | 2005-300306 A | 10/2005 |
| JP | 2006-10486 A | 1/2006 |
| JP | 2006-119037 A | 5/2006 |
| JP | 2006-170788 A | 6/2006 |

* cited by examiner

*Primary Examiner*—Kevin Pyo
(74) *Attorney, Agent, or Firm*—Birch, Stewart, Kolasch & Birch, LLP (57) ABSTRACT

In the photoelectric encoder of the invention, as a light passing zone PZ of a movable object 21 travels by one pitch P, an output signal OUT2 of a second logical operation unit 26b comes to be delayed in phase by 45° with respect to an output signal OUT1 of a first logical operation unit 26a. Therefore, an output having a resolution two times higher than that of the movable object having a phase difference of 90° can be obtained, where the width of each of light receiving elements 22a-22d is (¼)P. Accordingly, the width of each of the light receiving elements can be made two times larger, compared with the case where the width of each of the light receiving elements is (⅛)P as in conventional optical encoders. Thus, the output strength of the detection signal can be increased, so that the S/N ratio can be improved.

7 Claims, 12 Drawing Sheets

Fig.2A INPUT SIGNAL TO FIRST COMPARATOR 25a

Fig.2B OUTPUT SIGNAL OF FIRST COMPARATOR 25a

Fig.2C INPUT SIGNAL TO SECOND COMPARATOR 25b

Fig.2D OUTPUT SIGNAL OF SECOND COMPARATOR 25b

Fig.2E OUTPUT SIGNAL OF FIRST LOGICAL OPERATION UNIT 26a

Fig.2F INPUT SIGNAL TO THIRD COMPARATOR 25c

Fig.2G OUTPUT SIGNAL OF THIRD COMPARATOR 25c

Fig.2H INPUT SIGNAL TO FOURTH COMPARATOR 25d

Fig.2I OUTPUT SIGNAL OF FOURTH COMPARATOR 25d

Fig.2J OUTPUT SIGNAL OF SECOND LOGICAL OPERATION UNIT 26b

Fig.9H  INPUT SIGNAL TO THIRD COMPARATOR 25c

Fig.9I  OUTPUT SIGNAL OF THIRD COMPARATOR 25c

Fig.9J  INPUT SIGNAL TO FOURTH COMPARATOR 25d

Fig.9K  OUTPUT SIGNAL OF FOURTH COMPARATOR 25d

Fig.9L  OUTPUT SIGNAL OF SECOND LOGICAL OPERATION UNIT 26b

PRIOR ART Fig.12A
OUTPUT SIGNAL SC1 OF FIRST COMPARATOR 9a

PRIOR ART Fig.12B
OUTPUT SIGNAL SC2 OF SECOND COMPARATOR 9b

PRIOR ART Fig.12C
OUTPUT SIGNAL OUT1 OF FIRST LOGICAL OPERATION UNIT 10a

PRIOR ART Fig.12D
OUTPUT SIGNAL SC3 OF THIRD COMPARATOR 9c

PRIOR ART Fig.12E
OUTPUT SIGNAL SC4 OF FOURTH COMPARATOR 9d

PRIOR ART Fig.12F
OUTPUT SIGNAL OUT2 OF SECOND LOGICAL OPERATION UNIT 10b

| INPUT A | INPUT B | OUTPUT OF AND ELEMENT 11 | OUTPUT OF NOR ELEMENT 12 | OUTPUT OF OR ELEMENT 13 |
|---|---|---|---|---|
| 0 | 0 | 0 | 1 | 1 |
| 0 | 1 | 0 | 0 | 0 |
| 1 | 0 | 0 | 0 | 0 |
| 1 | 1 | 1 | 0 | 1 |

PHOTOELECTRIC ENCODER AND ELECTRONIC EQUIPMENT USING THE SAME

CROSS-REFERENCE TO RELATED APPLICATIONS

This nonprovisional application claims priority under 35 U.S.C. §119(a) on Patent Application No. 2006-233773 filed in Japan on Aug. 30, 2006 and Patent Application No. 2006-345859 filed in Japan on Dec. 22, 2006, the entire contents of which are hereby incorporated by reference.

BACKGROUND OF THE INVENTION

The present invention relates to a photoelectric encoder, as well as electronic equipment using the same, for detecting position, travel speed, travel direction and the like of a movable object by receiving, with a light receiving element, light transmitted or reflected by the movable object.

In printers, plotters, optical disk units and the like, photoelectric encoders are used in a mechanism for detecting displacement or displacement direction of a printing head or an optical head. As this type of photoelectric encoder, conventionally, there has been known a photoelectric rotary encoder disclosed in JP S59-40258 A.

Figure 10:
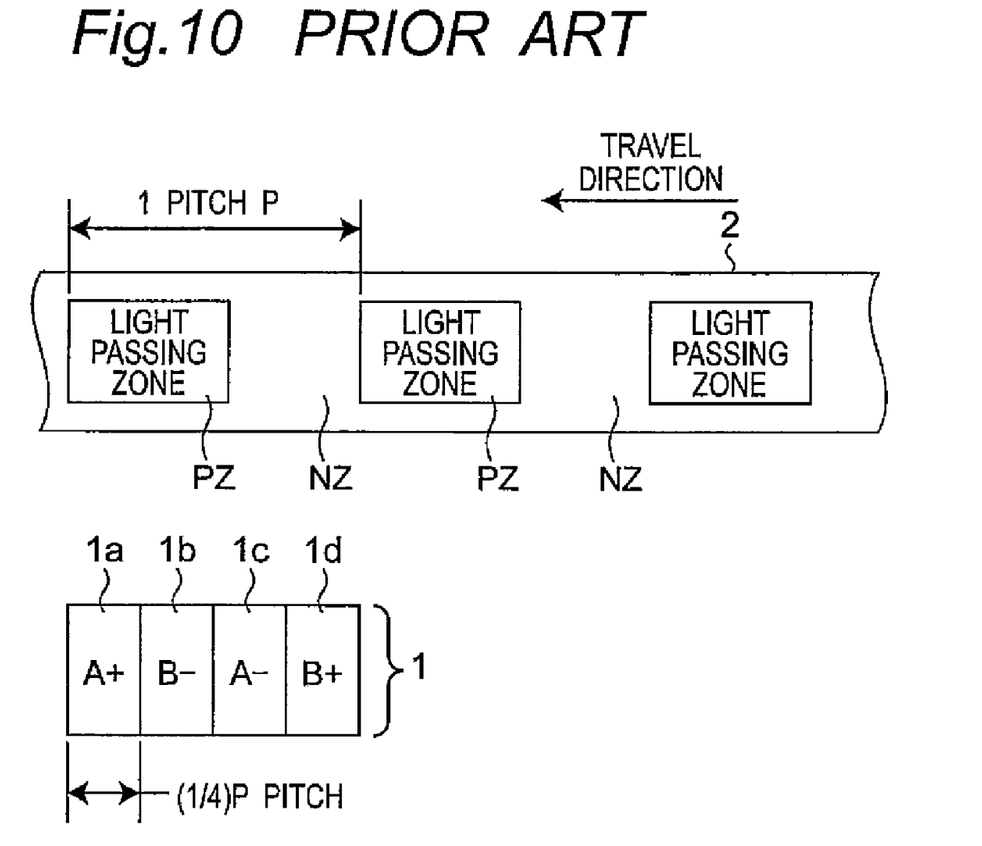
FIG. 10 is a view showing an optical part in a conventional photoelectric rotary encoder.

FIG. 10 shows an optical part in the photoelectric rotary encoder disclosed in JP S59-40258 A. Referring to FIG. 10, a movable object 2 that travels along an arrow direction is placed between a light emitting section (not shown) and a light receiving section 1 which are placed opposite each other. In this movable object 2, a light passing zone (which normally has a slit form) PZ and a light non-passing zone NZ are formed alternately at a constant pitch P along the travel direction. The light receiving part 1 is so formed that four light receiving elements 1a, 1b, 1c, 1d each having a width ((¼)P) corresponding to one half of the width (½)P of the light passing zone PZ and the light non-passing zone NZ in the movable object 2 are arrayed without clearances.

Then, out of four signals outputted from the light receiving elements 1a, 1b, 1c, 1d (the signals denoted by A+, B−, A−, B+, correspondingly in order), the signal A+ and the signal A− are inputted to a comparator (not shown) so as to be compared with each other, while the signal B+ and the signal B− are inputted to another comparator (not shown) so as to be compared with each other. Then, two output signals different in phase from each other by 90° are obtained.

As for the material of the movable object 2 to be used for the photoelectric rotary encoder, normally, metals or synthetic resins are used. However, because of limitations of fine processing of these materials, their resolutions are also limited naturally. For example, when a conventional photoelectric encoder using a linear scale-type movable object 2 is applied to a printer, attaining a resolution of 300 dpi would cause the width (½)P of each of the light passing zone PZ and the light non-passing zone NZ to be about 40 μm. Still more, its allowance for machining process would be ±10 odd μm. As a result, it has conventionally been considered impossible to use the movable object 2 made of metal or synthetic resin for use in large-scale printers.

Further, when glass is used as the material of the movable object 2, it is true that such resolutions as described above are attainable. However, because glass is fragile and liable to breakage, there is a need for ensuring the mechanical strength, which leads to a problem of considerably increased cost.

This being the case, with a view to solving such resolution-related problems as described above, there has been proposed an optical encoder which uses a conventionally used movable object and which is capable of obtaining a resolution higher than that of the movable object, as in the case of an optical position encoder disclosed in JP 2604986 U.

Figure 11:
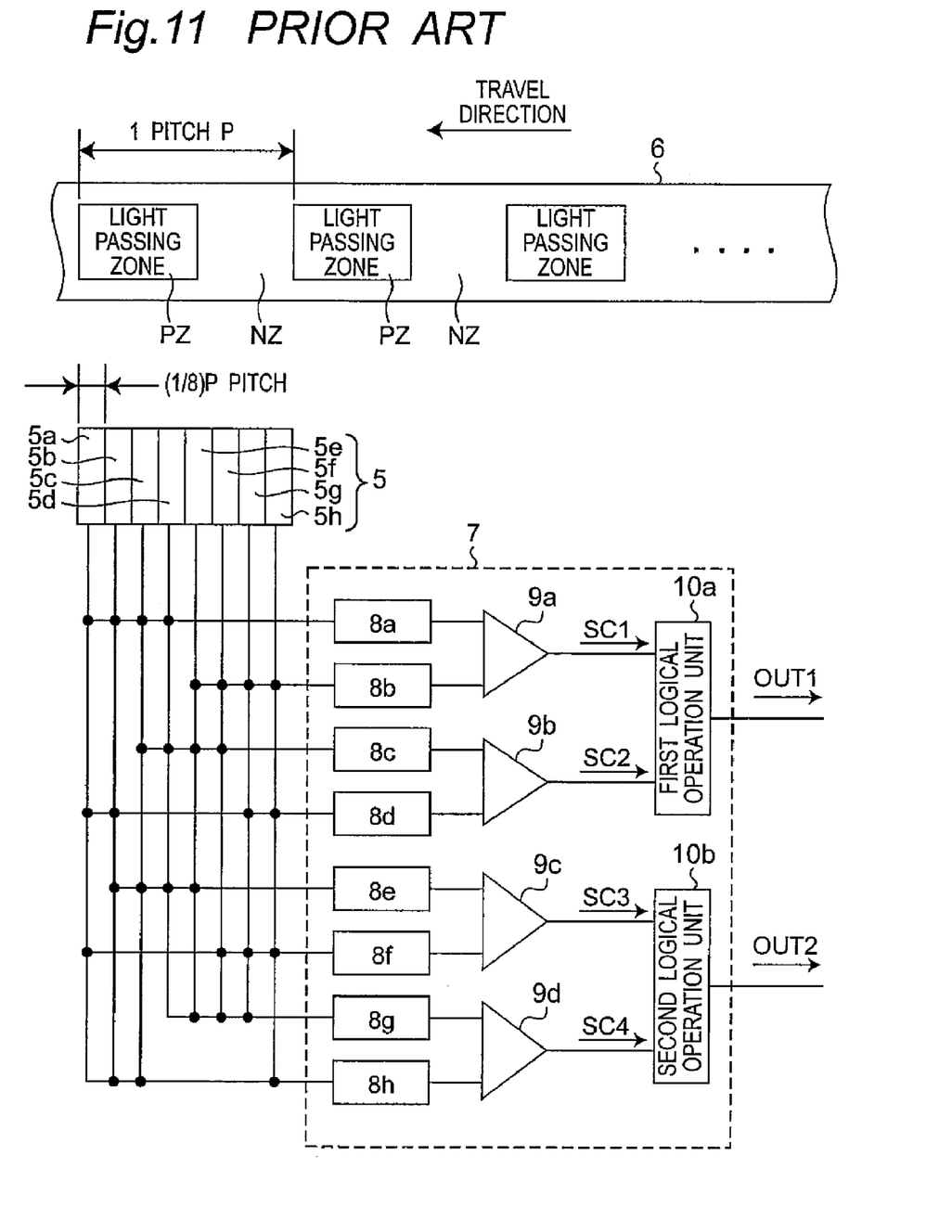
FIG. 11 is a view showing an outlined configuration of a conventional optical position encoder other than FIG. 10.

FIG. 11 shows a placement relation between light passing zone PZ and light non-passing zone NZ regions of a movable object 6 and eight light receiving elements 5a-5h constituting a light receiving section 5 in the optical position encoder disclosed in JP 2604986 U, as well as a configuration of a signal processing section 7 for calculating output signals of the individual light receiving elements 5a-5h.

Referring to FIG. 11, the optical position encoder includes a light emitting section (not shown), the movable object 6 in which the light passing zone PZ and the light non-passing zone NZ are formed alternately at a constant pitch P along its travel direction, a light receiving section 5 composed of eight light receiving elements 5a-5h arrayed on a straight line without clearances at a pitch of (⅛)P along the travel direction of the movable object 6, and a signal processing section 7 composed of eight adders 8a-8h, four comparators 9a-9d and two logical operation units 10a, 10b.

FIG. 12 shows waveforms of output signals of the first comparator 9a through fourth comparator 9d as well as the first, second logical operation units 10a, 10b in the signal processing section 7. It is noted that the horizontal axis represents displacement of the movable object 6. Hereinbelow, operations of the signal processing section 7 are described with reference to FIG. 12.

FIGS. 12A, 12B, 12D and 12E show output signals SC1-SC4 of the first to fourth comparators 9a-9d, respectively. With respect to the output signal SC1, the output signal SC2 has a phase difference of −90°, the output signal SC3 has a phase difference of −45°, and the output signal SC4 has a phase difference of −135°.

Figure 12A:
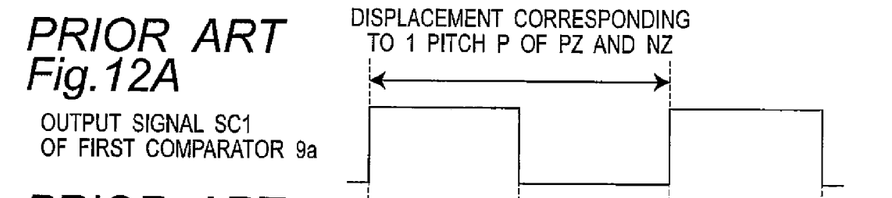
FIGS. 12A-12F are views showing waveforms of output signals of the individual comparators and the individual logical operation units in FIG. 11.
Figure 12B:
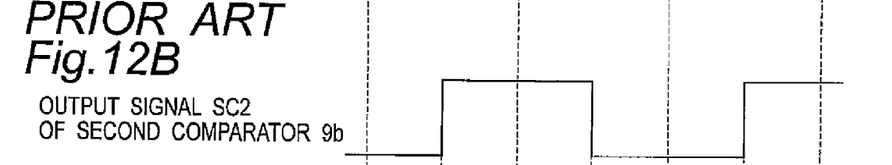
Figure 12C:
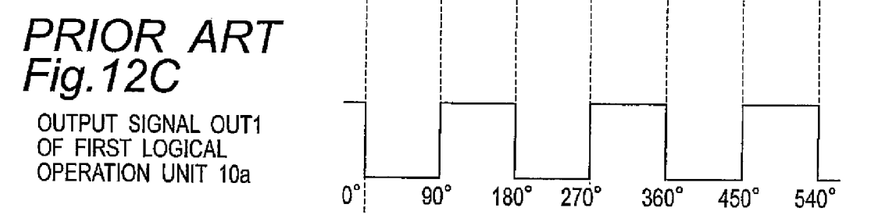
Figure 12D:
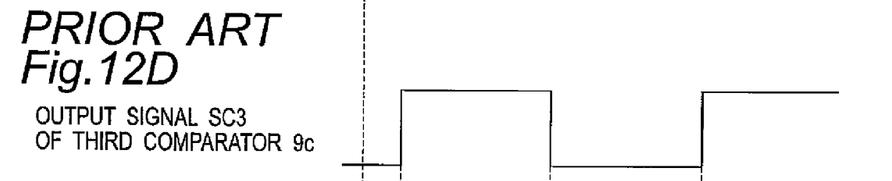
Figure 12E:
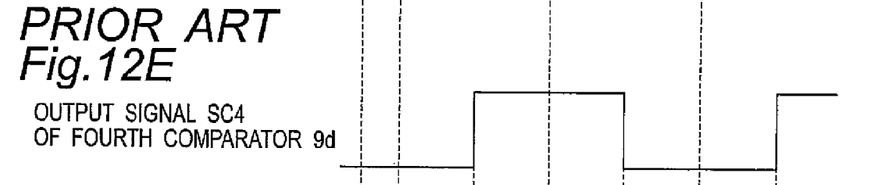
Figure 12F:
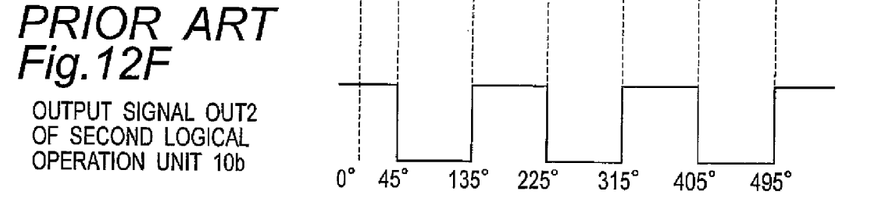
Figure 13A:
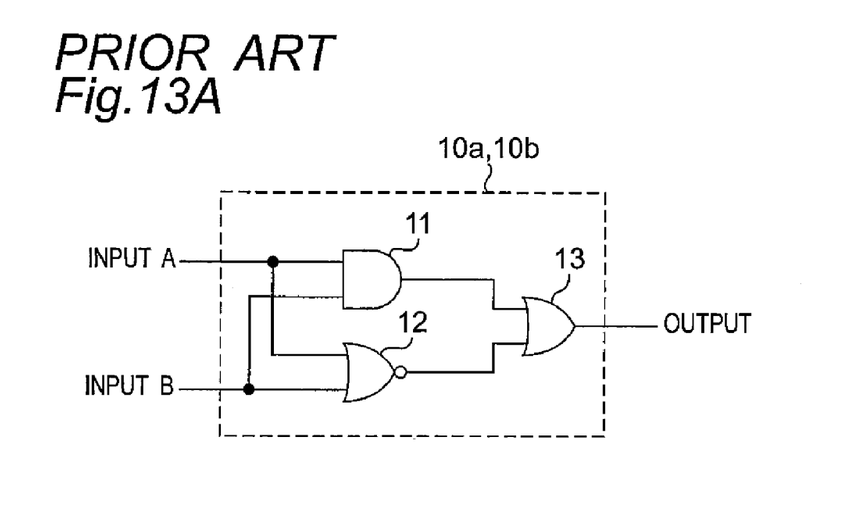
FIGS. 13A and 13B are circuit diagrams showing the configuration of each logical operation unit in FIG. 11.
Figure 13B:
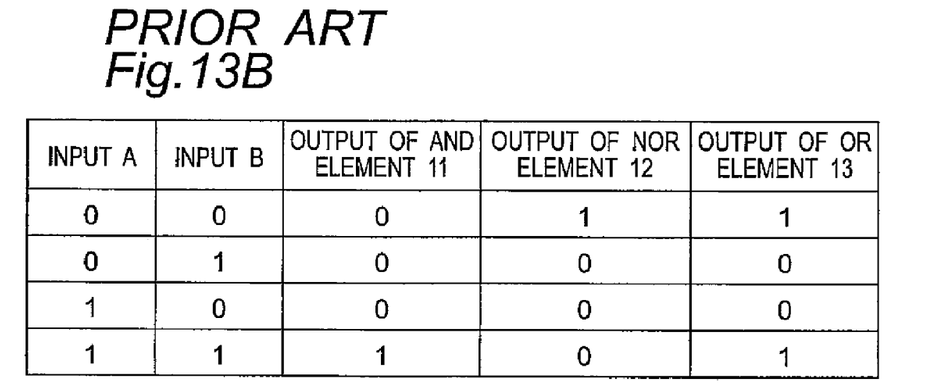

The first logical operation unit 10a and the second logical operation unit 10b, as shown in FIG. 13A, are each composed of an AND element 11, a NOR element 12 and an OR element 13. As can be seen from a truth table shown in FIG. 13B, an output signal of H level is outputted if input signals are both at H or L level, and otherwise an output signal of L level is outputted. FIG. 12C shows an output signal OUT1 of the first logical operation unit 10a, and FIG. 12F shows an output signal OUT2 of the second logical operation unit 10b.

As shown in FIGS. 12C and 12F, the first logical operation unit 10a and the second logical operation unit 10b produce output signals OUT1, OUT2, respectively, each having a 2-cycle waveform when the light passing zones PZ and the light non-passing zones NZ of the movable object 6 have traveled in the region of the light receiving section 5 to an extent of one pitch P. In this case, assuming that the one pitch P of repetition of the light passing zone PZ and the light non-passing zone NZ is 360°, then the output signal OUT2 of the second logical operation unit 10b is delayed in phase by 45° with respect to the output signal OUTS of the first logical operation unit 10a. That is, an output having a resolution two times higher than that of the movable object 2 having a phase difference of 90° can be obtained.

In this connection, because of limitations in fine processing of the light receiving elements 5a-5h in the above optical position encoder, resolutions higher than that of the movable object 6 can be obtained but attainable resolutions are limited.

For example, in order to attain an output of a 600 dpi resolution from the linear scale-type movable object 6 having a 300 dpi resolution, the array pitch of the light receiving elements 5a-5h becomes 10.6 μm. Like this, a theoretically required width of the light receiving elements 5a-5h is 10.6 µm at a maximum. However, in a case where there are no clearances between neighboring light receiving elements, because the light receiving elements tend to be more influenced by crosstalk, means (light insensitive material, light non-passing mask, etc.) for separating the neighboring light receiving elements from one another at a width of 5 µm to 10 µm need to be formed at boundary regions among the neighboring light receiving elements. As a result, the effective width of the light receiving elements 5a-5h to obtain a 600 dpi resolution output is 5.6 µm (10.6 µm-5 µm), given a 5 µm width of the "separation means", resulting in 52.8% as a ratio of effective light receiving element width to the theoretically obtainable light receiving element width. Further, subdividing the width of the light receiving elements 5a-5h would involve higher-priced semiconductor processes.

Therefore, in the optical position encoder disclosed in JP 2604986 U, the more the light receiving elements 5a-5h are scaled down in width, the more the ratio of the effective light receiving element width to the theoretically obtainable light receiving element width decreases. As a result, the level of the output signals OUT1, OUT2 become smaller, causing the output signal to be easily influenced by crosstalk of signals of adjacent other channels, which may lead to problems of decreases in the S/N ratio of detection signals as well as increases in cost,

SUMMARY OF THE INVENTION

Accordingly, an object of the present invention is to provide a photoelectric encoder, as well as electronic equipment using the same, which is capable of ensuring both a width of light passing zones (reflecting zones) of a movable object and a width of light receiving elements so as to prevent their characteristics from deteriorating, and also obtaining output signals higher in resolution than the movable object.

In order to achieve the above object, there is provided a photoelectric encoder including a light emitting element and a light receiving section to detect a movable object which has a light transmitting/reflecting zone for transmitting or reflecting light emitted from the light emitting element toward the light receiving section and a light non-transmitting zone for blocking light emitted from the light emitting element, wherein the light receiving section for receiving light derived from the light emitting element and transmitted or reflected by the light transmitting/reflecting zone in the movable object is composed of 2n (n is an integer, where n≧2) light receiving elements which are provided side by side in succession within a region having a width L times (L is a natural number, L and 2n are coprime to each other) larger than one pitch P of the light transmitting/reflecting zone or the light non-transmitting zone of the movable object, the photoelectric encoder further comprising:

a first rectangular-wave generation section for, in every one cycle T during which the light transmitting/reflecting zone and the light non-transmitting zone travel by the one pitch P, generating 2n rectangular waves whose phases differ from one another in units of 360°/4n and each of which has a cycle T, based on output signals from the 2n light receiving elements; and a second rectangular-wave generation section for, in every one cycle T, generating 2 rectangular waves whose phases differ from each other in units of 360°/4n and each of which has a cycle (1/n)T, based on the 2n rectangular waves generated by the first rectangular-wave generation section.

In this invention, as the light transmitting/reflecting zones and the light non-transmitting zones of the movable object travel by one pitch P, two rectangular waves whose phases differ from each other in units of 360°/4n and each of which has a cycle (1/n)T are outputted from the second rectangular-wave generation section. That is, a rectangular wave having a resolution n times higher than the resolution of the movable object is outputted.

Therefore, even in order to obtain an output having a resolution two (n=2) times higher than the resolution of the movable object, the number of light receiving elements to be provided together within a region having a width equal to one pitch P of the light transmitting/reflecting zones or the light non-transmitting zones of the movable object is four, and the width of each of the light receiving elements is (¼)P. As a result, the ratio of effective light receiving element width to theoretically obtainable light receiving element width can be improved to a large extent, in comparison to the photoelectric position encoder disclosed in JP 2604986 U in which the width of each of the light receiving elements is (⅛)P. Thus, the output strength of the detection signal can be increased so that the S/N ratio can be improved.

In one embodiment of the invention, the first rectangular-wave generation section includes a differential amplifier for performing differential amplification of output signals whose phases differ from each other by 180° out of the output signals from the 2n light receiving elements to generate 2n differential amplification signals.

In this embodiment, noise components of the output signals derived from the 2n light receiving elements can be efficiently removed, so that even if light received by the light receiving section is small in quantity, i.e., even if the output signals from the 2n light receiving elements are small in quantity, the S/N ratio for the output signals can be ensured.

In one embodiment of the invention, the first rectangular-wave generation section further comprises:

first comparison means for comparing output signals whose phases differ from each other by 180° out of the output signals from the 2n light receiving elements to generate n rectangular waves; and second comparison means for comparing 2n output addition signals which are obtained by adding output signals whose phases differ from one another by 360°/2n in units of 2k (k is a natural number, where n≧2k) out of the output signals from the 2n light receiving elements, to generate n rectangular waves.

In this embodiment, by generating 2n output addition signals which are obtained by adding output signals from the 2n light receiving elements in units of 2k, 2n (i.e., the number of the light receiving elements) rectangular waves whose phases differ from one another in units of 360°/4n and each of which has a cycle T can be generated in each one cycle T, i.e., each time the light transmitting/reflecting zones and the light non-transmitting zones travel by one pitch P.

In one embodiment of the invention, the first rectangular-wave generation means includes correction amplifiers for correcting and amplifying amplitudes of the output signals and the output addition signals so that the 2n output signals derived from the 2n light receiving elements and the 2n output addition signals become generally equal in amplitude to each other.

In this embodiment, deflection of the amplitude of input signals to the first comparison means and the second comparison means for generating rectangular waves can be reduced, so that phase characteristics of a rectangular-wave output from the first comparison means and a rectangular-wave output from the second comparison means can be improved.

In one embodiment of the invention, the light receiving section is composed of light receiving elements which are provided side by side in succession within a region having a width equal to a plurality of pitches of the light transmitting/reflecting zone or the light non-transmitting zone of the movable object, further comprising connections for connecting outputs of light receiving elements, to each other, which have an identical phase in a modulation cycle of incident light due to a travel of the movable object.

In this embodiment, by connecting outputs of the light receiving elements, which have an identical phase in a modulation cycle of incident light due to a travel of the movable object, to each other, the output signals from the connected light receiving elements are added together. Therefore, the output signals from the light receiving section can be increased, so that the S/N ratio can be improved.

In one embodiment of the invention, the integer n has a value of 2.

In this case, a resolution of 600 dpi can be obtained, for example, even with the use of a movable object of 300 dpi equal to that of conventional ones and light receiving elements each having a width of (¼)P equal to that of conventional ones. Therefore, decreases in the ratio of effective light receiving element width to theoretically obtainable light receiving element width, and therefore decreases in the S/N ratio as well, can be suppressed without the need for narrowing the width of the light receiving elements.

In one embodiment of the invention, an electronic equipment includes the above photoelectric encoder.

In this case, the electronic equipment includes a photoelectric encoder which is capable of obtaining a resolution of some integral multiple of the resolution of the movable object and yet capable of obtaining a high S/N ratio. Therefore, displacement magnitude as well as displacement direction of the movable object can be detected with high accuracy. Thus, the electronic equipment is enabled to perform proper operations by using the detection results.

As apparent from the above description, in the photoelectric encoder of the present invention, for obtainment of an output having resolution n times (n is an integer, where n≧2) higher than that of the movable object, the light receiving section is made up by arraying 2n light receiving elements at a pitch (1/2n)-fold of the array pitch P of the light transmitting/reflecting zones and the light non-transmitting zones of the movable object. Therefore, the array pitch of the light receiving elements can be made two times larger than the array pitch of the light receiving elements of the photoelectric encoder disclosed in JP 2604986 U, so that the required number of light receiving elements can be reduced to a half.

Accordingly, in the case where neighboring light receiving elements are separated from one another by insensitive material or light non-passing mask or the like, a large width can be ensured as the effective light receiving element width. As a result, the total light-reception area can be increased, the output strength of detection signals can be increased, and thus the S/N ratio can be improved.

Further, if the value of the integer n is 2, then a two times higher resolution can be obtained even with the use of a movable object having a resolution of 300 dpi equal to the conventional counterpart and light receiving elements each having a width of (¼)P equal to the conventional counterpart. In that case, since the array pitch of the light receiving elements is set to a double of the array pitch of the light receiving elements in the photoelectric encoder disclosed in JP 2604986 U, there can be achieved a reduction in cost.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Hereinbelow, the present invention will be described in detail by way of embodiments thereof illustrated in the accompanying drawings.

First Embodiment

Figure 1:
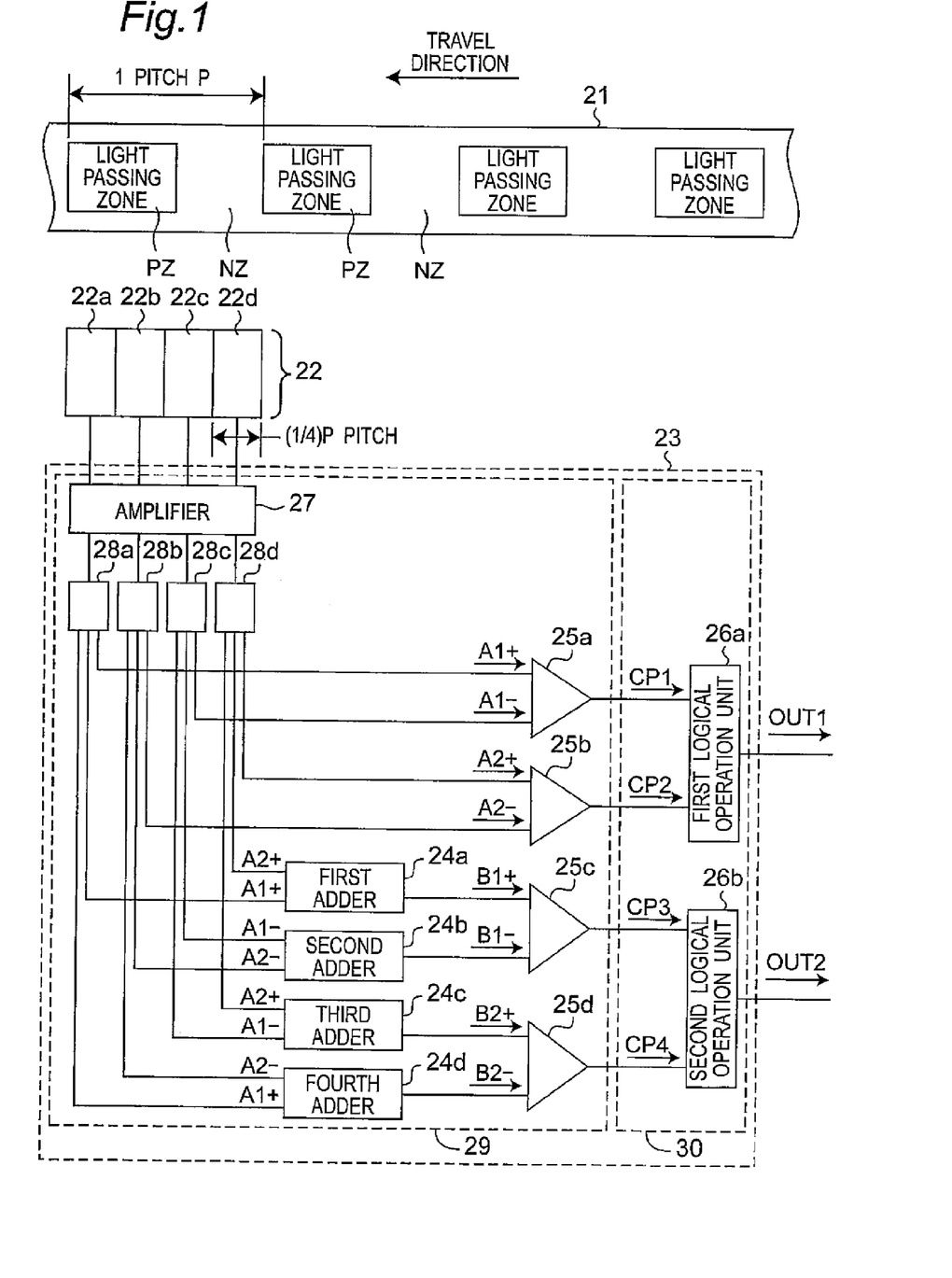
FIG. 1 is a view showing an outlined configuration of a photoelectric encoder in a first embodiment of the present invention.

FIG. 1 shows an outlined configuration of a photoelectric encoder according to this embodiment, including the placement relation between light passing zone PZ and light non-passing zone NZ of a movable object 21 and four light receiving elements 22a-22d constituting a light receiving section 22 and further including the configuration of a signal processing section 23 for calculating output signals of the individual light receiving elements 22a-22d.

As shown in FIG. 1, this optical encoder includes a light emitting section (not shown), a movable object 21 in which the light passing zone PZ and the light non-passing zone NZ are formed alternately at a constant pitch P along its travel direction, a light receiving section 22 composed of four (2n, where n=2) light receiving elements 22a-22d arrayed on a straight line without clearances at a pitch of (¼)P ((L/2n)P, where L=1, n=2)) along the travel direction of the movable object 21, and a signal processing section 23 composed of an amplifier 27, four signal distributors 28a-28d (hereinafter, referred to generically as signal distributors 28), four adders 24a-24d (hereinafter, referred to generically as adders 24), four comparators 25a-25d (hereinafter, referred to generically as comparators 25) and two logical operation units 26a, 26b.

To the amplifier 27 in the signal processing section 23, photocurrents from the four light receiving elements 22a-22d are inputted and amplified to output signals A1+, A2−, A1−, A2+, respectively. The output signals A1+, A2−, A1−, A2+ from the amplifier 27 are inputted to the signal distributors 28a-28d, respectively. In this case, the signal distributors 28a-28d are implemented by, for example, current mirror circuits, from which signals identical to input signals are outputted as their output signals. Then, the output signals A1+, A2−, A1−, A2+ derived from the signal distributors 28a-28d are inputted to the adders 24a-24d and the comparators 25a, 25b.

Output signals (A1+, A2+) resulting from amplification of photocurrents, which are derived from the two light receiving elements 22a, 22d, by means of the amplifier 27 are inputted to the first adder 24a. Output signals (A2−, A1−) resulting from amplification of photocurrents, which are derived from the two light receiving elements 22b, 22c, by means of the amplifier 27 are inputted to the second adder 24b. Output signals (A1−, A2+) resulting from amplification of photocurrents, which are derived from the two light receiving elements 22c, 22d, by means of the amplifier 27 are inputted to the third adder 24c. Further, output signals (A1+, A2−) resulting from amplification of photocurrents, which are derived from the two light receiving elements 22a, 22b, by means of the amplifier 27 are inputted to the fourth adder 24d. Meanwhile, output signals (A1+, A1−) resulting from amplification of photocurrents, which are derived from the two light receiving elements 22a, 22c, by means of the amplifier 27 are inputted to the first comparator 25a. Also, output signals (A2−, A2+) resulting from amplification of photocurrents, which are derived from the two light receiving elements 22b, 22d, by means of the amplifier 27 are inputted to the second comparator 25b.

Output addition signals (B+(="A1+"+"A2+"), B1−(="A2−"+"A1−")) generated by the first adder 24a and the second adder 24b are inputted to the third comparator 25c. Also, output addition signals (B2+(="A1−"+"A2+"), B2−(="A1+"+"A2−")) generated by the third adder 24c and the fourth adder 24d are inputted to the fourth comparator 25d.

FIG. 2 shows waveforms of input/output signals of the first comparator 25a, input/output signals of the second comparator 25b, an output signal of the first logical operation unit 26a, input/output signals of the third comparator 25c, input/output signals of the fourth comparator 25d, and an output signal of the second logical operation unit 26b. It is noted that the horizontal axis represents displacement of the movable object 21. Hereinbelow, operations of the signal processing section 23 are described with reference to FIG. 2.

FIGS. 2A, 2C, 2F and 2H show transitions in input signals to the comparators 25, respectively (i.e., output signals of the signal distributors 28 and the adders 24, respectively). As shown in FIGS. 2A, 2C, 2F and 2H, the output signals A1−, A2− are delayed in phase from the output signals A1+, A2+, respectively, and the output addition signals B1−, B2− are delayed in phase from the output addition signals B1+, B2+, respectively, by 180° in both cases. Also, the output signal A2+ is delayed in phase from the output signal A1+, and the output addition signal B2+ is delayed in phase from the output addition signal B1+, by 90° in both cases.

Further, amplitudes of the output addition signals B1+, B1−, B2+, B2− are double those of the output signals A1+, A1−, A2+, A2−, respectively.

Figure 2A:
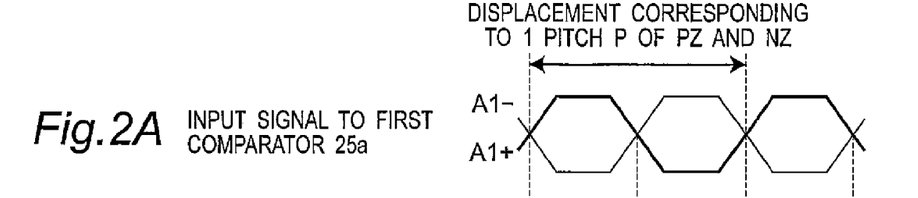
FIGS. 2A-2J are views showing waveforms of input/output signals of the individual comparators and output signals of the individual logical operation units in FIG. 1.
Figure 2B:
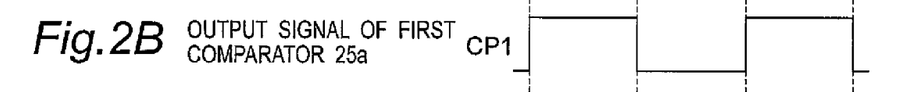
Figure 2C:
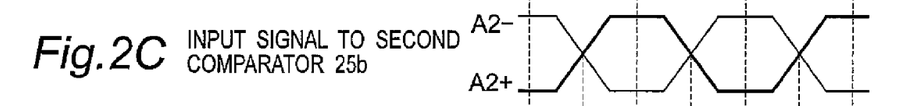
Figure 2D:
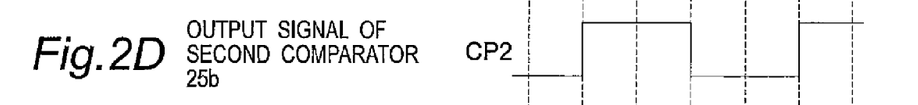
Figure 2E:
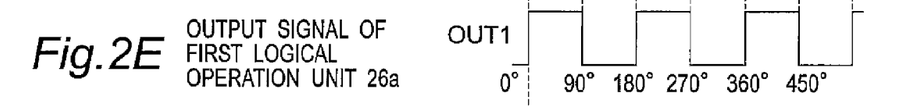
Figures 2F, 2G:
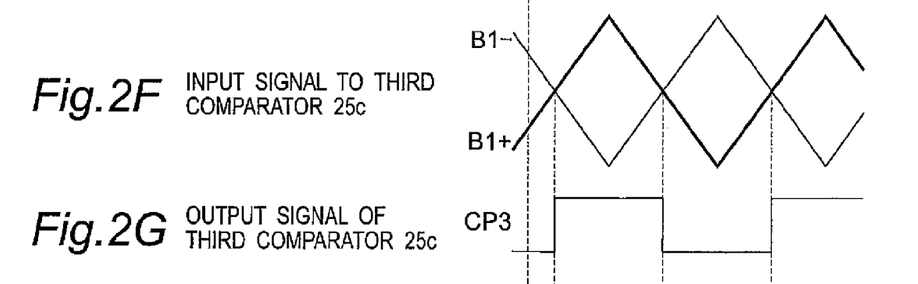
Figure 2H:
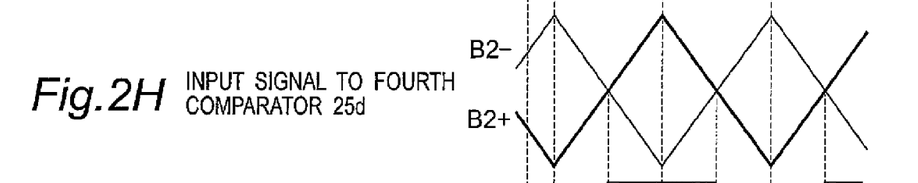
Figure 2I:
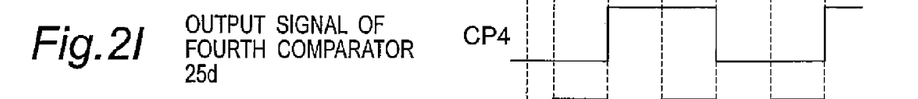

The first comparator 25a, as shown in FIGS. 2A and 2B, compares the output signal A1+ and the output signal A1− with each other, and outputs a signal of H level just for a period during which the output signal A1+ keeps larger than the output signal A1−. The second comparator 25b, as shown in FIGS. 2C and 2D, compares the output signal A2+ and the output signal A2− with each other, and outputs a signal of H level just for a period during which the output signal A2+ keeps larger than the output signal A2−. The third comparator 25c, as shown in FIGS. 2F and 2G, compares the output signal B1+ and the output signal B1− with each other, and outputs a signal of H level just for a period during which the output signal B1+ keeps larger than the output signal B1−. The fourth comparator 25d, as shown in FIGS. 2H and 2I, compares the output signal B2+ and the output signal B2− with each other, and outputs a signal of H level just for a period during which the output signal B2+ keeps larger than the output signal B2−.

FIGS. 2B, 2D, 2G and 2I show transitions in output signals CP1-CP4 from the first to fourth comparators 25a-25d, respectively. As shown in FIGS. 2B, 2D, 2G and 2I, the output signals CP2, CP4 are delayed in phase from the output signals CP1, CP3, respectively, by 90°. Also, the output signals CP3, CP4 are delayed in phase from the output signals CP1, CP2, respectively, by 45°.

That is, in every one cycle T, i.e., each time the light passing zones PZ and the light non-passing zones NZ have traveled by one pitch P, four (2n, where n=2) rectangular waves whose phases differ from one another in units of 45° (360°/4n, where n=2) and each of which has a cycle T are generated from four (2n, where n=2) outputs of the light receiving elements 22a-22d. Thus, in this embodiment, the amplifier 27, the first to fourth signal distributors 28a-28d, the first to fourth adders 24a-24d, and the first to fourth comparators 25a-25d constitute a first rectangular-wave generation section 29.

In other words, the first rectangular-wave generation section 29 is composed of: first comparison means (first, second comparators 25a, 25b) for comparing four (2n, where n=2) output signals of the light receiving elements 22a-22d with one another and outputting two (n, where n=2) rectangular waves whose phases differ from each other by 90° (360°/2n, where n=2) and each of which has a cycle T; and second comparison means (third, fourth comparators 25c, 25d) for comparing four output addition signals which are obtained by adding four (2n, where n=2) output signals of the light receiving elements 22a-22d in units of two (2k, where k=1) signals to generate two (n, where n=2) rectangular waves whose phases differ from each other by 90° (360°/2n, where n=2) and whose phases differ from the output signals of the first comparison means by 45° (360°/4n, where n=2) and each of which has a cycle T.

Figure 2J:
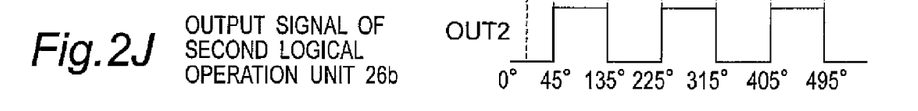

The first logical operation unit 26a is implemented by an exclusive OR circuit which calculates an exclusive OR (EXOR) between a logical value represented by the output signal CP1 of the first comparator 25a and a logical value represented by the output signal CP2 of the second comparator 25b. Similarly, the second logical operation unit 26b is implemented by an exclusive OR circuit which calculates an EXOR between a logical value represented by the output signal CP3 of the third comparator 25c and a logical value represented by the output signal CP4 of the fourth comparator 25d. FIGS. 2E and 2J show transitions in the output signals OUT1, OUT2 of the first, second logical operation units 26a, 26b.

As shown in FIGS. 2E and 2J, when the light passing zones PZ and the light non-passing zones NZ of the movable object 21 have traveled in the region of the light receiving section 22 by one pitch P, the first, second logical operation units 26a, 26b output signals of a 2-cycle waveform. Then, assuming that the one pitch P of repetition of the light passing zone PZ and the light non-passing zone NZ is 360°, the output signal OUT2 from the second logical operation unit 26b is delayed in phase by 45° with respect to the output signal OUT1 of the first logical operation unit 26a. That is, in this embodiment, the first, second logical operation units 26a, 26b constitute a second rectangular-wave generation section 30.

In addition, instead of the exclusive OR circuits that implement the first, second logical operation units 26a, 26b, respectively, for example, an exclusive AND circuit or an exclusive NOR circuit, or an exclusive NAND circuit or the like may be used to generate the output signals OUT1, OUT2. It is noted that the exclusive OR circuit is to output a signal of H level just for a period during which the number of input signals each having a truth value that is "true" is an odd number and therefore the number of its input signals is not limited to "2."

As shown above, according to this embodiment, an output having a resolution two (n, where n=2) times higher than the resolution of the movable object 21 can be obtained.

In that case, four light receiving elements 22a-22d are arrayed without clearances over a range equal to the one pitch P that is the array pitch of the light passing zones PZ and the light non-passing zones NZ of the movable object 21, where the width of each of the light receiving elements 22a-22d is ($\frac{1}{4}$)P. Accordingly, for obtainment of a resolution two times higher than the resolution of the movable object 21, the width of each of the light receiving elements 22a-22d can be made two times larger, compared with the case where eight light receiving elements 5a-5h are arrayed without clearances over a range corresponding to one pitch P that is the array pitch of the light passing zones PZ and the light non-passing zones NZ of the movable object 6 so that the width of each of the light receiving elements 5 is ($\frac{1}{8}$)P as in the case of the optical position encoder disclosed in JP 2604986 U.

Accordingly, in this embodiment, for obtainment of a resolution of 600 dpi from the linear scale-type movable object 21 of 300 dpi, the array pitch of the light receiving elements 22a-22d becomes 21.2 μm (a double of 10.6 μm of JP 2604986 U), so that given a width of 5 μm of the means for separating neighboring light receiving elements from one another, the effective light receiving element width results in 16.2 μm (21.2 μm-5 μm). That is, the ratio of effective light-receiving-element width to the theoretically obtainable light-receiving-element width is 76.4%, hence a great improvement as compared with the ratio, 52.8%, of the effective light-receiving-element width to the theoretically obtainable light-receiving-element width in the optical position encoder disclosed in JP 2604986 U.

Also, the total effective light-reception area of the four light receiving elements 22a-22d in this embodiment is 16.2 μm×4×light receiving element length (μm)=64.7×light receiving element length (μm$^2$). In contrast to this, the total effective light-reception area in the optical position encoder disclosed in JP 2604986 U is 5.6 μm×8×light receiving element length (μm)=44.8×light receiving element length (μm$^2$). Accordingly, the output strength of a detection signal can be increased as compared with the case of the optical position encoder disclosed in JP 2604986 U, so that the S/N ratio can be improved.

It can also be said that connecting the signal processing section 23 of this embodiment to the light receiving section of the photoelectric encoder disclosed in JP 2604986 U makes it possible to obtain an output having a resolution two times higher than the resolution that can be obtained by the photoelectric encoder disclosed in JP 2604986 U.

Second Embodiment

Figure 3:
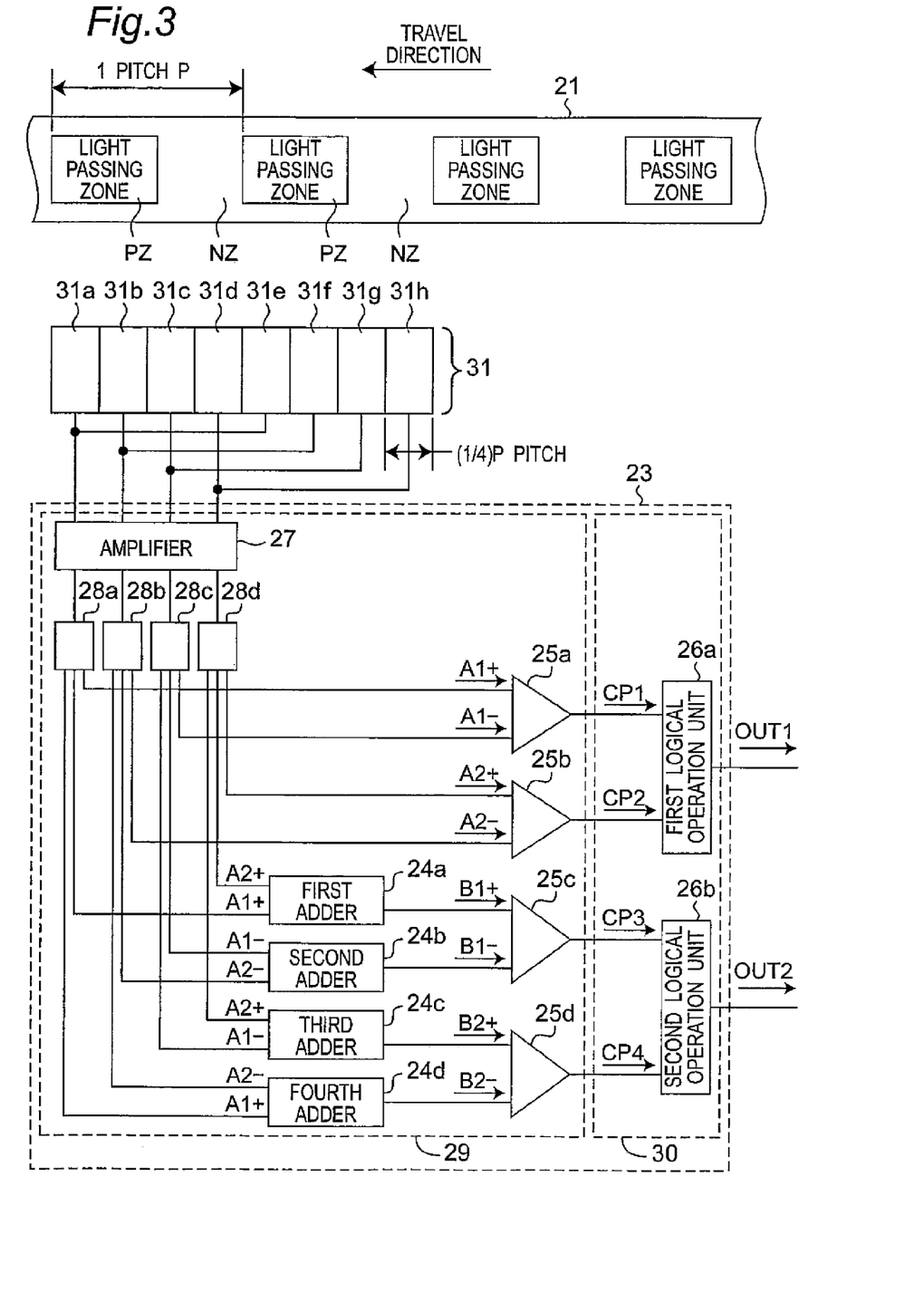
FIG. 3 is a view showing an outlined configuration of a photoelectric encoder in a second embodiment of the present invention.

FIG. 3 shows an outlined configuration of a photoelectric encoder according to this embodiment. This photoelectric encoder is the same as the photoelectric encoder of the first embodiment shown in FIG. 1 except for a light receiving section 31, and therefore, the same reference numerals as in FIG. 1 are used and its detailed description is omitted. It is noted that this embodiment is intended to explain mostly the contents of claim 5.

The light receiving section 31 is composed of eight light receiving elements 31a-31h arrayed on a straight line without clearances along the travel direction of the movable object 2 at a pitch of ($\frac{1}{4}$)P ((L/2n)P, where L=1, n=2). That is, the light receiving section 31 has an arrangement that the light receiving section 22 of the photoelectric encoder of the first embodiment shown in FIG. 1 is arrayed two in number. In this case, the light receiving elements 31e-31h function in the utterly same manner as the light receiving elements 22a-22d (i.e., the light receiving elements 31a-31d) in the photoelectric encoder shown in FIG. 1. Therefore, by connecting the light receiving elements 31e-31h in parallel to the respective light receiving elements 31a-31d, output signals from the light receiving section 31 can be enhanced, so that the S/N ratio can be improved.

Third Embodiment

Figure 4:
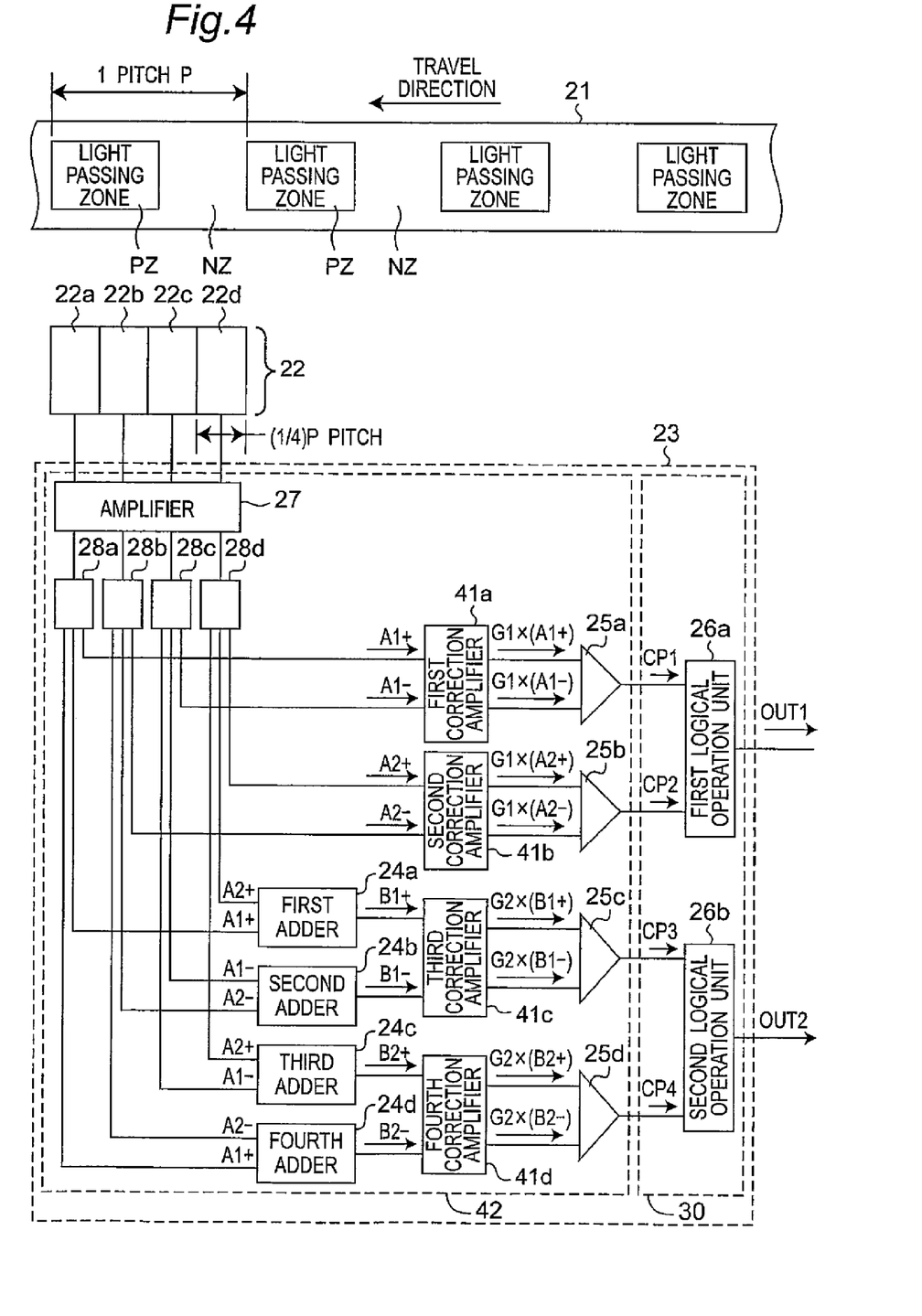
FIG. 4 is a view showing an outlined configuration of a photoelectric encoder in a third embodiment of the present invention.

FIG. 4 shows an outlined configuration of a photoelectric encoder of this embodiment. This photoelectric encoder has a configuration that other circuits are added to the signal processing section 23 of the photoelectric encoder of the first embodiment shown in FIG. 1.

In the signal processing section 23 of this photoelectric encoder, first, second correction amplifiers 41a, 41b are placed between the signal distributors 28a-28d and the first, second comparators 25a, 25b in the signal processing section 23 of the first embodiment shown in FIG. 1, and third, fourth correction amplifiers 41c, 41d (hereinafter, referred to generically as correction amplifiers 41) are placed between the adders 24a-24d and the third, fourth comparators 25c, 25d. Otherwise, the photoelectric encoder of this embodiment is the same as that of the first embodiment, and therefore the same component parts are designated by the same reference numerals as in FIG. 1 and their detailed description is omitted.

That is, in this embodiment, the amplifier 27, the first to fourth signal distributors 28a-28d, the first to fourth adders 24a-24d, the first to fourth correction amplifiers 41a-41d and the first to fourth comparators 25a-25d constitute a first rectangular-wave generation section 42. It is noted that this embodiment is intended to explain mostly the contents of claim 4.

Output signals (A1+, A1−) (their waveforms are shown in FIG. 2A) resulting from amplification of photocurrents, which are derived from the two light receiving elements 22a, 22c, by means of the amplifier 27 are inputted to the first correction amplifier 41a, which then outputs G1-fold amplified corrective amplification signals (G1×(A1+), G1×(A1−)) to the first comparator 25a. Output signals (A2−, A2+) (their waveforms are shown in FIG. 2C) resulting from amplification of photocurrents, which are derived from the two light receiving elements 22b, 22d, by means of the amplifier 27 are inputted to the second correction amplifier 41b, which then outputs G1-fold amplified corrective amplification signals (G1×(A2−), G1×(A2+)) to the second comparator 25b.

In contrast to this, output addition signals (B1+(="A1+"+ "A2+"), B1−(="A2−"+"A1−")) (their waveforms are shown in FIG. 2F) generated by the first adder 24a and the second adder 24b are inputted to the third correction amplifier 41c, which then outputs G2-fold amplified corrective amplification signals (G2×(B1+), G2×(B1−)) to the third comparator 25c. Also, output addition signals (B2+(="A1−"+"A2+"), B2−(="A1+"+"A2−")) (their waveforms are shown in FIG. 2H) generated by the third adder 24c and the fourth adder 24d are inputted to the fourth correction amplifier 41d, which then outputs G2-fold amplified corrective amplification signals (G2×(B2+), G2×(B2−)) to the fourth comparator 25d.

The amplification factors G1, G2 of the correction amplifiers 41a-41d are, desirably, so set that amplitudes of input signals to the comparators 25 become generally equal to those of the photoelectric encoder of the first embodiment. In the signal processing section 23 of the photoelectric encoder of the first embodiment, as shown in FIGS. 2A, 2C, 2F and 2H, the amplitudes of the output addition signals B1+, B1−, B2+, B2− are double those of the output signals A1+, A1−, A2+, A2−, respectively. For this reason, in this embodiment, the amplification factor G1 to amplification factor 52 ratio, G1:G2, is set as 2:1.

In addition, the value of the amplification factor ratio, G1:G2, is a value that should be adjusted depending on amplitudes of the output signals A1+, A1−, A2+, A2− and the output addition signals B1+, B1−, B2+, B2−, and that is not limited to the ratio, 2:1.

As shown above, according to the photoelectric encoder of this embodiment, deflection of amplitudes of the input signals to the comparators 25 can be reduced. Accordingly, phase characteristics can be improved for outputs of the rectangular output signal CP1, CP2 derived from the first comparison means (first, second comparators 25a, 25b) as well as outputs of the rectangular output signals CP3, CP4 derived from the second comparison means (third, fourth comparators 25c, 25d).

Fourth Embodiment

Figure 5:
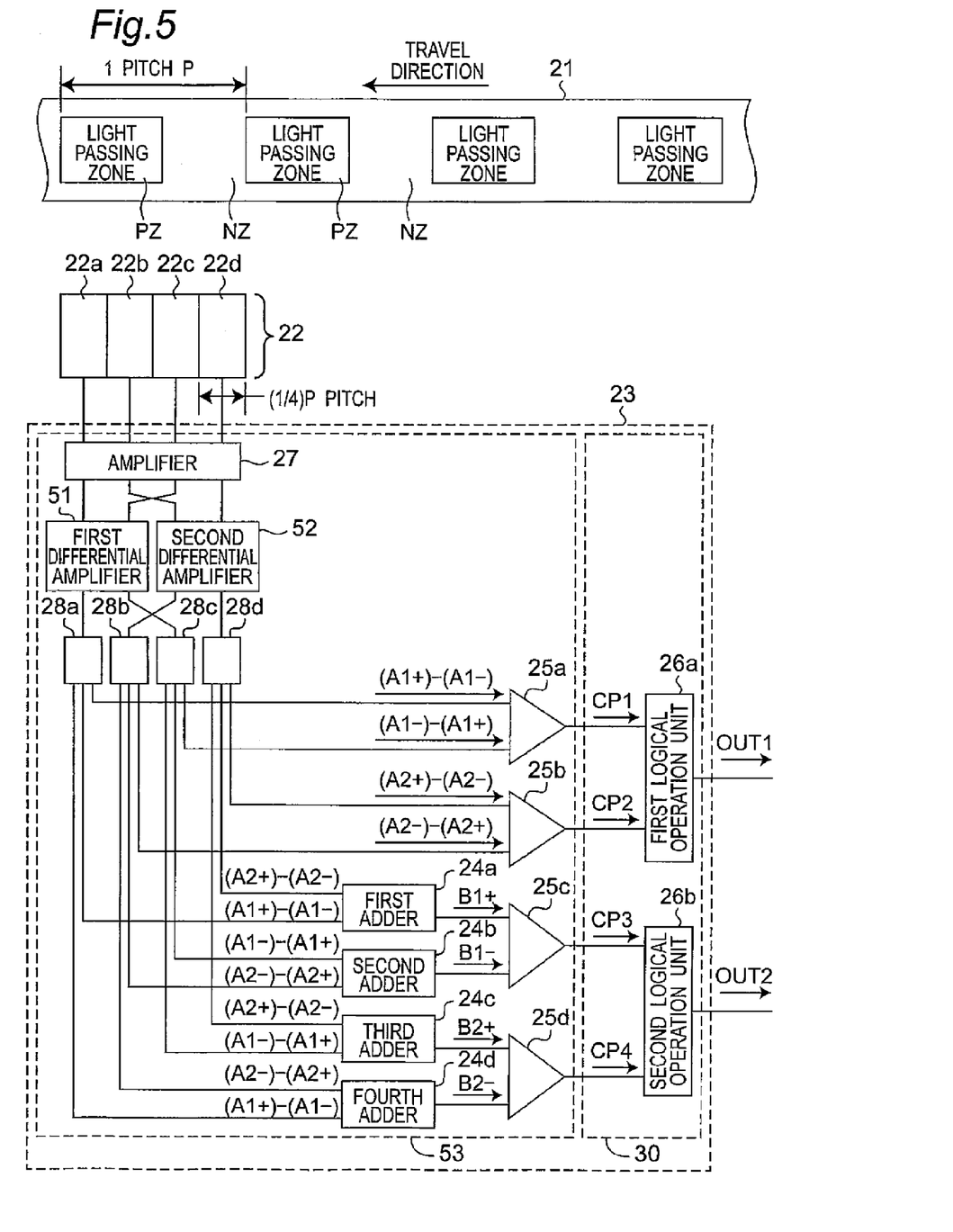
FIG. 5 is a view showing an outlined configuration of a photoelectric encoder in a fourth embodiment of the present invention.

FIG. 5 shows an outlined configuration of a photoelectric encoder of this embodiment. This photoelectric encoder has a configuration that other circuits different from those of the third embodiment are further added to the signal processing section 23 of the photoelectric encoder of the first embodiment shown in FIG. 1.

In the signal processing section 23 of this photoelectric encoder, first, second differential amplifiers 51, 52 are placed between the amplifier 27 and the signal distributors 28 in the signal processing section 23 of the first embodiment shown in FIG. 1. Otherwise, the photoelectric encoder of this embodiment is the same as that of the first embodiment, and therefore the same component parts are designated by the same reference numerals as in FIG. 1 and their detailed description is omitted.

That is, in this embodiment, the amplifier 27, the first differential amplifier 51, the second differential amplifier 52, the first to fourth signal distributors 28a-28d, the first to fourth adders 24a-24d and the first to fourth comparators 25a-25d constitute a first rectangular-wave generation section 53. It is noted that this embodiment is intended to explain mostly the contents of claim 2.

Output signals (A1+, A1−) (their waveforms are shown in FIG. 2A) resulting from amplification of photocurrents, which are derived from the two light receiving elements 22a, 22c, by means of the amplifier 27 are inputted to the first differential amplifier 51. Then, the first differential amplifier 51 outputs a differential amplification signal ((A1+)−(A1−)) to the first signal distributor 28a, while outputting a differential amplification signal ((A1−)−(A1+)) to the third signal distributor 28c. Output signals (A2−, A2+) (their waveforms are shown in FIG. 2C) resulting from amplification of photocurrents, which are derived from the two light receiving elements 22b, 22d, by means of the amplifier 27 are inputted to the second differential amplifier 52. Then, the second differential amplifier 52 outputs the differential amplification signal ((A2−)−(A2+)) to the second signal distributor 28b, while outputting the differential amplification signal ((A2+)−(A2−)) to the fourth signal distributor 28d.

Figure 6:
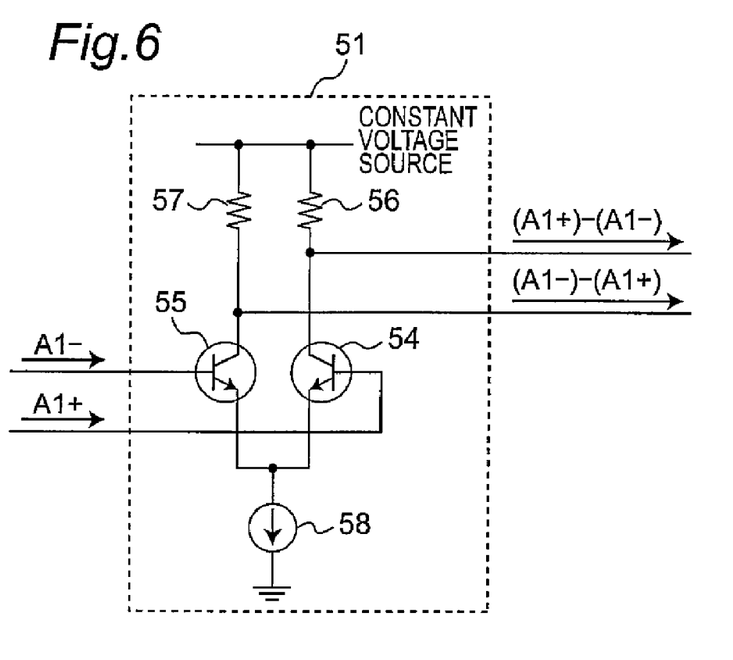
FIG. 6 is a circuit diagram showing the configuration of the first differential amplifier in FIG. 5.
Figure 7:
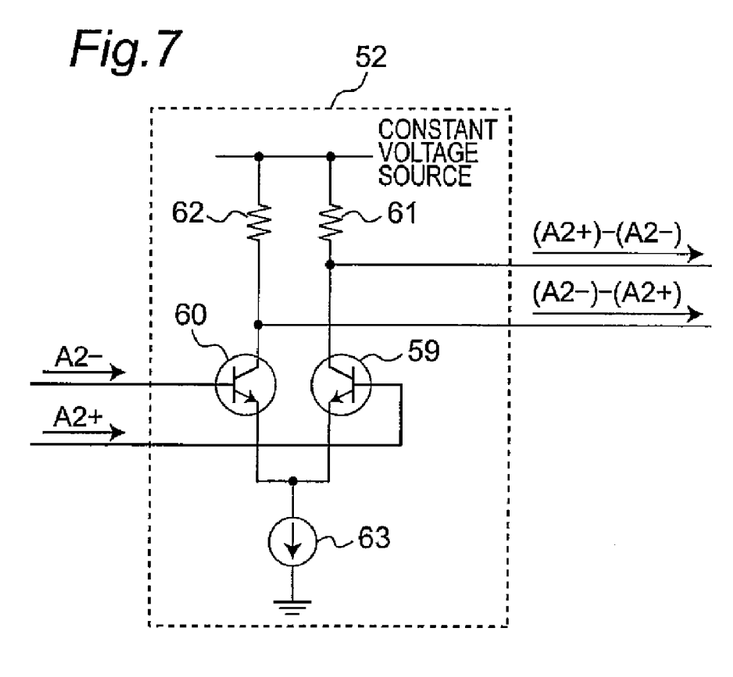
FIG. 7 is a circuit diagram showing the configuration of the second differential amplifier in FIG. 5.

In the first differential amplifier 51, for example, as shown in FIG. 6, two transistors 54, 55 are connected to each other by their emitter terminals, and grounded via a constant current source 58. Further, collector terminals of the transistors 54, 55 are biased via resistors 56, 57, respectively. Then, base terminals of the transistors 54, 55 are connected to output terminals of the amplifier 27 which are dedicated to the two output signals A1+, A1− different in phase from each other by 180°. Similarly, in the second differential amplifier 52, for example, as shown in FIG. 7, two transistors 59, 60 are connected to each other by their emitter terminals, and grounded via a constant current source 63. Further, collector terminals of the transistors 59, 60 are biased via resistors 61, 62, respectively. Then, base terminals of the transistors 59, 60 are connected to output terminals of the amplifier 27 which are dedicated to the two output signals A2+, A2− different in phase from each other by 180°.

With the adoption of the configuration of the first, second differential amplifiers 51, 52, a differential amplification signal (A1+)−(A1−) and a differential amplification signal (A1=)−(A1+) are generated from the first differential amplifier 51. Also, a differential amplification signal (A2+)−(A2−) and a differential amplification signal (A2−)−(A2+) are generated from the second differential amplifier 52.

FIG. 8 shows waveforms of an input signal to the first differential amplifier 51, input/output signals of the first comparator 25a, an input signal to the second differential amplifier 52, input/output signals of the second comparator 25b, and an output signal of the first logical operation unit 26a. FIG. 9 shows waveforms of input/output signals of the third comparator 25c, input/output signals of the fourth comparator 25d, and an output signal of the second logical operation unit 26b. It is noted that the horizontal axis represents displacement of the movable object 21. Hereinbelow, operations of the signal processing section 23 are described with reference to FIGS. 8 and 9.

Figure 8A:
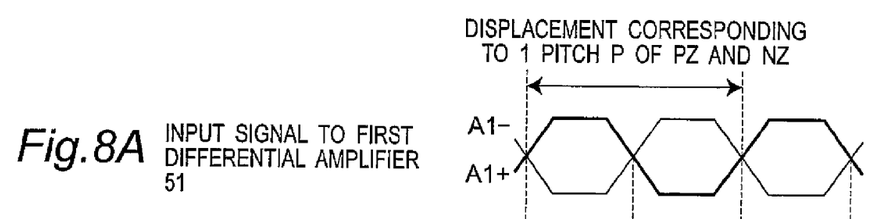
FIGS. 8A-8G are views showing waveforms of input signals to the first, second differential amplifiers, input/output signals of the first, second comparators, and an output signal of the first logical operation unit in FIG. 5.
Figure 8B:
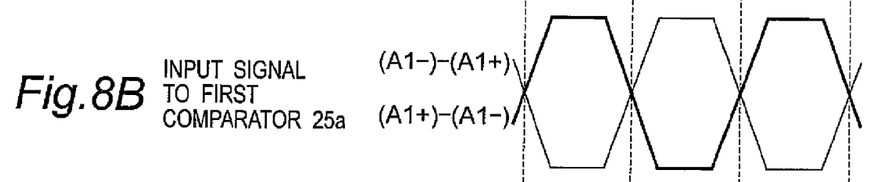
Figure 8C:
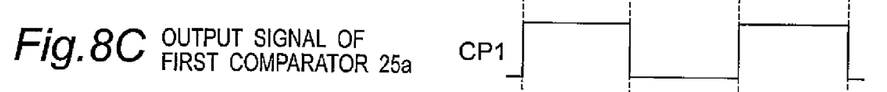
Figures 8D, 8E:
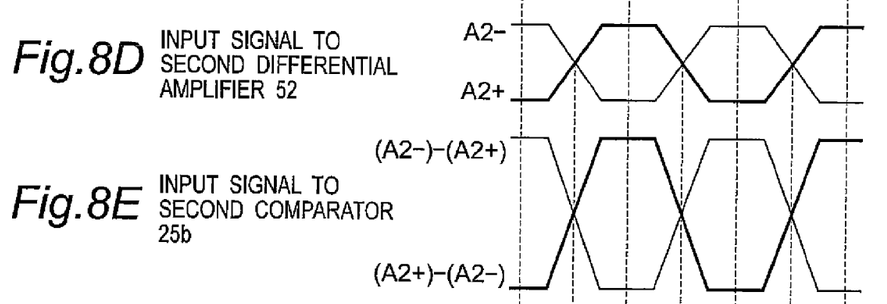
Figure 8F:
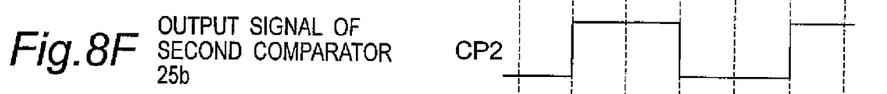
Figure 8G:
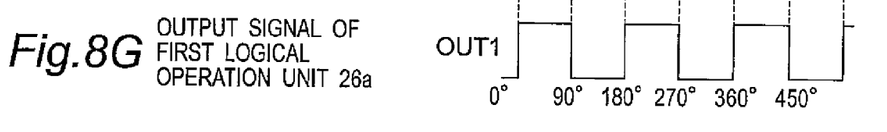
Figures 9H, 9I:
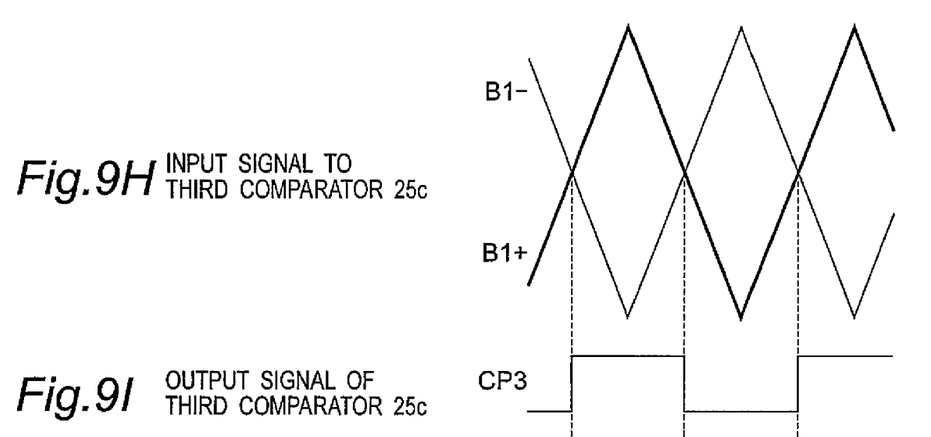
FIGS. 9H-9L are views showing waveforms of input/output signals of the third, fourth comparators, and an output signal of the second logical operation unit in FIG. 5.
Figures 9J, 9K:
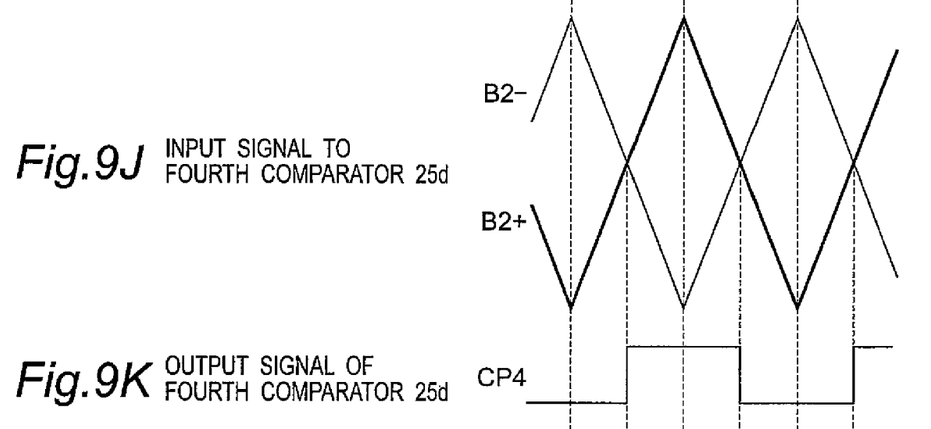
Figure 9L:
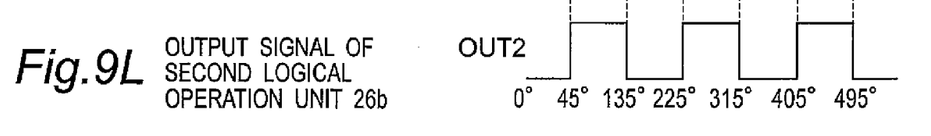

FIGS. 8A and 8D show transitions in input signals to the first, second differential amplifiers 51, 52. The waveforms of these input signals are identical to those of the input signals to the first comparator 25a shown in FIG. 2A and those of the input signals to the second comparator 25b shown in FIG. 2C (i.e., identical to those of the output signals of the amplifier 27) in the first embodiment. According to this embodiment, as shown in FIGS. 8A, 8B, 8D, 8E, 9H and 9J, it becomes achievable to improve the S/N ratio of input signals to the comparators 25 without causing any changes in phase relations of the input signals to the individual differential amplifiers 51, 52 as well as to the individual comparators 25a-25d. The following operations after the comparators 25 are as described in the first embodiment.

As described above, according to this embodiment, differential amplification of the output signals (A1+, A1−) of the light receiving elements 22a, 22c is performed by the first differential amplifier 51, differential amplification of the output signals (A2−, A2+) of the light receiving elements 22b, 22d is performed by the second differential amplifier 52, and the above-described addition and comparison calculations with the use of differential amplification results are performed by the adders 24a-24d and the comparators 25a-25d. Therefore, noise components of the output signals derived from the light receiving elements 22a-22d can be efficiently removed, so that even if the light received by each of the light receiving elements 22a-22d is small in quantity, i.e., even if the photocurrent outputted by each of the light receiving elements 22a-22d is small in quantity, a high S/N ratio can be ensured.

The foregoing individual embodiments have been described on the assumption that L=1 and n=2. However, it is needless to say that outputs having resolutions n-times (n is an integer, where n≧2) higher than the resolution of the movable object 21 can be obtained, provided that the array pitch of the light receiving elements 22a-22d is (L/2n)×P (n is an integer, where n≧2, L is a natural number, and L and 2n are coprime to each other).

As described above, according to the foregoing embodiments, even in the case where a resolution of 600 dpi is obtained from the linear scale-type movable object 21 of, for example, 300 dpi, the output strength of the detection signal can be increased so that a high S/N ratio can be obtained. Thus, the optical encoders in the foregoing embodiments are suitable for use in a mechanism for detecting displacement or displacement direction of a printing head or an optical head in printers, plotters, optical disk units, and the like.

Although the foregoing embodiments have been described on a case of a light transmission-type photoelectric encoder as an example, the present invention is not limited to this as a matter of course. The present invention is applicable also to light reflection-type photoelectric encoders similarly.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A photoelectric encoder including a light emitting element and a light receiving section to detect a movable object which has a light transmitting/reflecting zone for transmitting or reflecting light emitted from the light emitting element toward the light receiving section and a light non-transmitting zone for blocking light emitted from the light emitting element, wherein
the light receiving section for receiving light derived from the light emitting element and transmitted or reflected by the light transmitting/reflecting zone in the movable object is composed of 2n (n is an integer, where n≧2) light receiving elements which are provided side by side in succession within a region having a width L times (L is a natural number, L and 2n are coprime to each other) larger than one pitch P of the light transmitting/reflecting zone or the light non-transmitting zone of the movable object, the photoelectric encoder further comprising:
a first rectangular-wave generation section for, in every one cycle T during which the light transmitting/reflecting zone and the light non-transmitting zone travel by the one pitch P, generating 2n rectangular waves whose phases differ from one another in units of 360°/4n and each of which has a cycle T, based on output signals from the 2n light receiving elements; and
a second rectangular-wave generation section for, in every one cycle T, generating 2 rectangular waves whose phases differ from each other in units of 360°/4n and each of which has a cycle (1/n)T, based on the 2n rectangular waves generated by the first rectangular-wave generation section.

2. The photoelectric encoder as claimed in claim 1, wherein the first rectangular-wave generation section includes a differential amplifier for performing differential amplification of output signals whose phases differ from each other by 180° out of the output signals from the 2n light receiving elements to generate 2n differential amplification signals.

3. The photoelectric encoder as claimed in claim 1, wherein the first rectangular-wave generation section further comprises:
first comparison means for comparing output signals whose phases differ from each other by 180° out of the output signals from the 2n light receiving elements to generate n rectangular waves; and
second comparison means for comparing 2n output addition signals which are obtained by adding output signals whose phases differ from one another by 360°/2n in units of 2k (k is a natural number, where n≧2k) out of the output signals from the 2n light receiving elements, to generate n rectangular waves.

4. The photoelectric encoder as claimed in claim 3, wherein the first rectangular-wave generation means includes
correction amplifiers for correcting and amplifying amplitudes of the output signals and the output addition signals so that the 2n output signals derived from the 2n light receiving elements and the 2n output addition signals become generally equal in amplitude to each other.

5. The photoelectric encoder as claimed in claim 1, wherein the light receiving section is composed of light receiving elements which are provided side by side in succession within a region having a width equal to a plurality of pitches of the light transmitting/reflecting zone or the light non-transmitting zone of the movable object, further comprising
connections for connecting outputs of light receiving elements, to each other, which have an identical phase in a modulation cycle of incident light due to a travel of the movable object.

6. The photoelectric encoder as claimed in claim 1, wherein the integer n has a value of 2.

7. Electronic equipment including the photoelectric encoder as defined in claim 1.

* * * * *